(12) United States Patent  (10) Patent No.: US 8,287,052 B2
Fakhoury et al.  (45) Date of Patent: Oct. 16, 2012

(54) WHEEL HUB HAVING IMPROVED STRESS DISTRIBUTION

(75) Inventors: Omar J. Fakhoury, Vancouver, WA (US); Joseph A. Brotherton, Portland, OR (US)

(73) Assignee: Kic Holdings, Inc., Vancouver, WA (US)

( * ) Notice: Subject to any disclaimer, the term of this patent is extended or adjusted under 35 U.S.C. 154(b) by 282 days.

(21) Appl. No.: 12/648,035

(22) Filed: Dec. 28, 2009

(65) Prior Publication Data

US 2011/0156475 A1   Jun. 30, 2011

(51) Int. Cl.
*B60B 27/00* (2006.01)
(52) U.S. Cl. .............................. 301/105.1; 301/35.627
(58) Field of Classification Search .................. 301/6.1, 301/6.3, 6.5, 6.8, 35.621, 105.1, 106; 188/17, 188/18 A, 218 R, 218 XL
See application file for complete search history.

(56) References Cited

U.S. PATENT DOCUMENTS

| | | | | |
|---|---|---|---|---|
| 4,811,992 A | * | 3/1989 | Steiner | 301/105.1 |
| D381,615 S | | 7/1997 | Smith et al. | |
| 6,257,678 B1 | * | 7/2001 | Brookey et al. | 301/105.1 |
| 6,612,657 B1 | | 9/2003 | Fakhoury et al. | |
| 6,866,345 B2 | | 3/2005 | Fakhoury et al. | |
| 7,111,911 B2 | * | 9/2006 | Baumgartner et al. | 301/105.1 |
| 7,159,697 B1 | | 1/2007 | Fakhoury et al. | |
| 7,393,064 B2 | | 7/2008 | Hall et al. | |

* cited by examiner

*Primary Examiner* — Jason Bellinger
(74) *Attorney, Agent, or Firm* — Marger, Johnson & McCollom, P.C.

(57) ABSTRACT

A wheel hub includes a barrel, a flange extending radially away from the barrel and a connection member connecting the flange to the barrel. The barrel includes an outboard bearing bore and an inboard bearing bore. The flange at least partially overlaps the inboard bearing bore along a radial direction perpendicular to a longitudinal axis of the barrel. The connection member includes an outboard side facing toward the outboard bearing bore and defining outboard ribs and outboard recesses alternately disposed around the circumference of the barrel. Each outboard recess is interposed between the flange and the barrel along the radial direction perpendicular to the longitudinal axis of the barrel.

8 Claims, 15 Drawing Sheets

WHEEL HUB HAVING IMPROVED STRESS DISTRIBUTION

BACKGROUND

1. Technical Field

This disclosure relates to a wheel hub for a motor vehicle such as a tractor-trailer. More specifically, this disclosure relates to a wheel hub having a design reducing stress concentrations at a barrel and flange.

2. Description of the Related Art

Wheel hubs connect the wheel of a vehicle to the axle and, therefore, are subjected to significant loads in bearing the weight of the vehicle. Furthermore, wheel hubs contribute to a portion of the overall weight of vehicles designed for commercial freight hauling and similar uses. Such commercial vehicles are subject to state and federal regulations that impose restrictions on the overall weight of the loaded vehicle. Thus, any reduction in the weight of the wheel hubs will directly increase the amount of freight that can be hauled by such vehicles. However, the weight of a wheel hub cannot easily be reduced because the wheel hub must be strong enough to withstand stresses generated during use.

FIG. 1 illustrates a perspective view of the outboard side of a conventional wheel hub. FIG. 2 illustrates a section view of the wheel hub shown in FIG. 1, as viewed along line II-II' shown in FIG. 1.

Referring to FIGS. 1 and 2, a conventional wheel hub 10 generally includes a barrel 12 and a flange 14 connected to the barrel 12 by a connection member 16. A vehicle's wheel (not shown) is secured to the flange 14 by bolts (not shown) extending through apertures 14a formed in the flange 14. Pilot bosses 18 are used to align the wheel and brake drum to the wheel hub 10. The vehicle's axle (not shown) is received by a hub cavity 20 within the barrel 12. The axle is supported within the hub cavity 20 by an inboard bearing assembly and an outboard bearing assembly (both not shown), which are respectively disposed within an inboard bearing bore 22 and an outboard bearing bore 24 formed within the barrel 12 at opposite ends of the hub cavity 20.

In addition, a conventional wheel hub 10 often includes ribs 26 to provide added mechanical support to the pilot bosses 18. Each rib 26 typically extends from the connection member 16 and connects a pilot boss 18 directly to the barrel 12.

During operation of a vehicle, the axle is subjected to forces which tend to bend the barrel 12 relative to the flange 14. As shown in FIG. 2, each rib 26 connects a pilot boss 18 to a portion of the barrel 12 surrounding the hub cavity 20. Thus, load paths extending between the barrel 12 and the flange 14 travel through each pilot boss 18. As a result, the ribs 26 tend to generate regions of concentrated stress within the barrel 12 and the flange 14 when the barrel 12 bends relative to the flange 14. Cracks can be undesirably generated in the barrel 12 and the flange 14 due to the regions of concentrated stress.

DETAILED DESCRIPTION OF THE EMBODIMENTS

Figure 1:
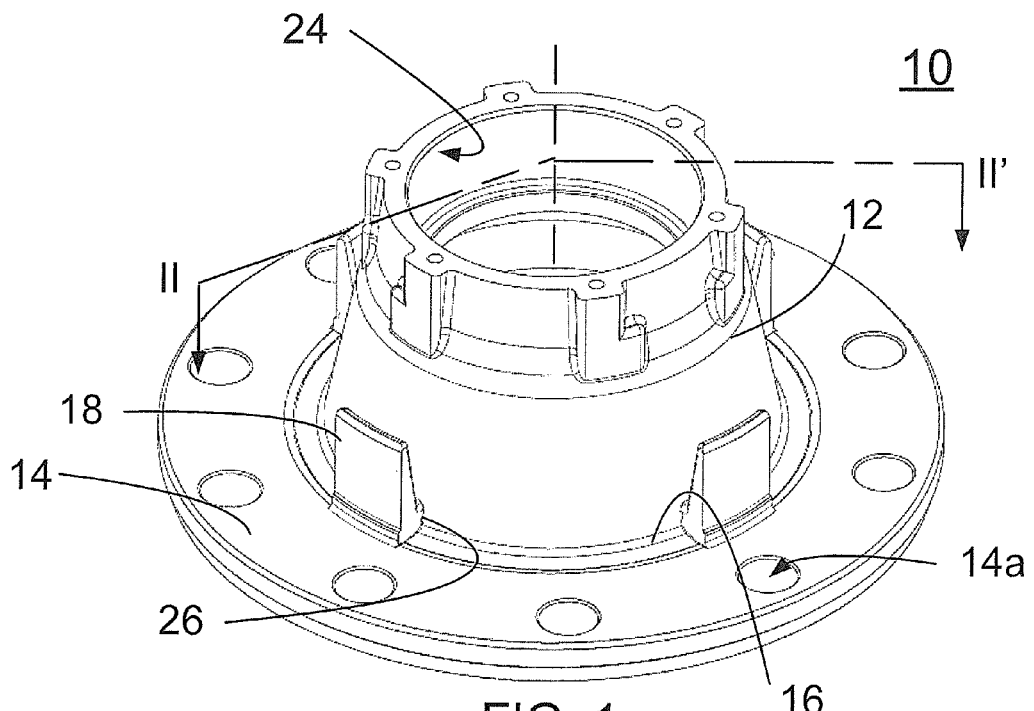
FIG. 1 illustrates a perspective view of the outboard side of a conventional wheel hub.

Example embodiments are described below with reference to the accompanying drawings. Many different forms and embodiments are possible without deviating from the spirit and teachings of the invention and so the disclosure should not be construed as limited to the example embodiments set forth herein. Rather, these example embodiments are provided so that this disclosure will be thorough and complete, and will convey the scope of the invention to those skilled in the art. In the drawings, the sizes and relative sizes of components may be exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-section illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A wheel hub according to embodiments described herein may, for example, include a barrel, a flange extending radially away from the barrel, and a connection member connecting the flange to the barrel.

The barrel includes an outboard bearing bore and an inboard bearing bore.

In one embodiment, the flange may at least partially overlap the inboard bearing bore along a radial direction perpendicular to a longitudinal axis of the barrel. In another embodiment, however, the flange may not overlap the inboard bearing bore at all.

The connection member generally includes an outboard side facing toward the outboard bearing bore and an inboard side facing toward the inboard bearing bore.

The outboard side of the connection member defines outboard ribs and outboard recesses alternately disposed around the circumference of the barrel.

Each outboard rib may be provided as a fillet, a convex protuberance, or as any other desired shape. The shape of one or more of the outboard ribs may be the same as or different from the shape another of the outboard ribs. Each outboard recess is interposed between the flange and the barrel along the radial direction perpendicular to the longitudinal axis of the barrel. The portion of the connection member defined by the outboard ribs delineates the load paths between the barrel and the flange along which most of the load forces generated within the wheel hub are transmitted. The outboard recesses tend to reduce the total weight of the wheel hub. Together, the outboard ribs and the outboard recesses allow the weight of a wheel hub to be reduced while leaving the wheel hub strong enough to withstand stresses generated during use.

In one embodiment, the wheel hub may further include a pilot boss connected to the connection member and disposed within an outboard recess. Because each outboard recess is interposed between the flange and the barrel, the pilot boss is effectively cantileveredly connected to the connection member such that one end of the pilot boss is connected to the connection member and the remainder of the pilot boss within the outboard recess and outside the outboard recess is not connected to the barrel or the flange. Because loads are primarily transmitted between the barrel and the flange via the outboard ribs, and because the pilot boss is cantileveredly connected to the connection member within the outboard recesses, regions of concentrated stress within the barrel and the flange can be reduced or eliminated if the barrel bends relative to the flange. Thus, the pilot boss can be substantially isolated from load paths extending between the barrel and the flange. As a result, the occurrence and extent of cracks generated in the barrel and flange due to bending of the barrel relative to the flange can be reduced or eliminated.

In one embodiment, the wheel hub may further include a sunken relief between the pilot boss and the flange. Generally, the wheel hub is provided as a unitary, cast piece. Accordingly, the sunken relief may be provided as an as-cast relief or as a machined relief.

In one embodiment, the inboard side of the connection member defines a fillet extending from the barrel to the flange. The fillet may define a large, smooth continuous curve extending from a side of the flange facing toward the inboard bearing bore to the barrel.

In one embodiment, the fillet extends continuously around the circumference of the barrel. In another embodiment, the inboard side of the connection member defines inboard ribs disposed about the circumference of the barrel and extending from the barrel to the flange. The inboard ribs may be offset relative to the outboard ribs along the circumference of the barrel.

In one embodiment, the wheel hub may be formed as a unitary, cast piece of a material such as ductile iron. In other embodiments, the wheel hub of may be formed a material such as aluminum, aluminum alloys, magnesium alloys, carbon-fiber composites, or the like. Depending on the material used, the wheel hub may have a weight of about 23-33 lbs.

Examples of some embodiments of the above-described wheel hub will now be discussed in detail with respect to the accompanying drawings.

Figure 3:
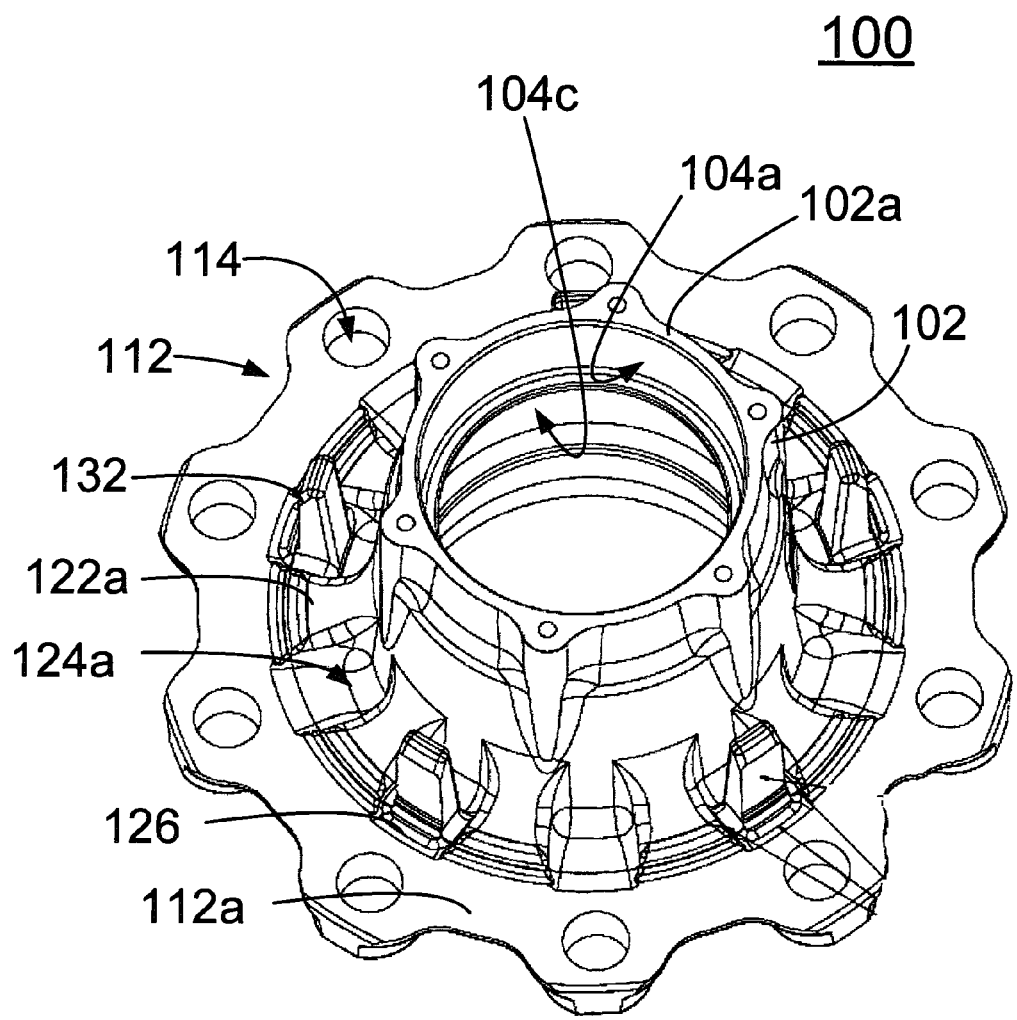
FIG. 3 illustrates a perspective view of the outboard side of a wheel hub according to a first embodiment.
Figure 4:
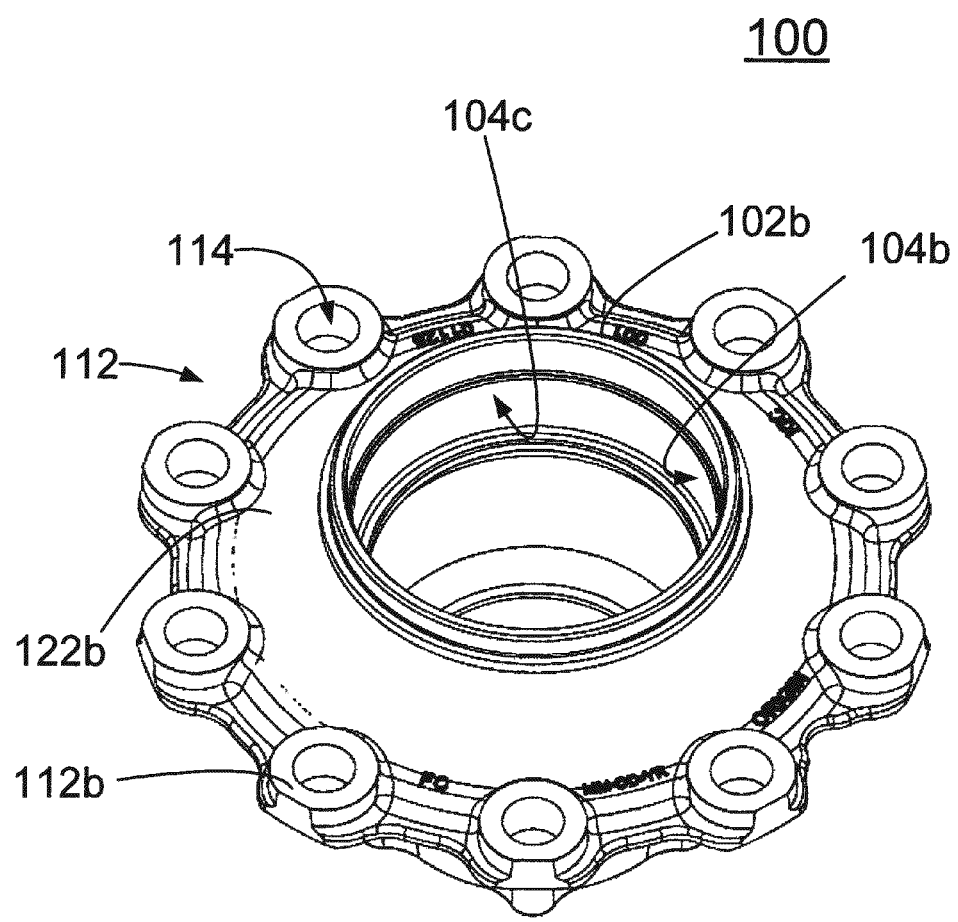
FIG. 4 illustrates a perspective view of the inboard side of the wheel hub shown in FIG. 3.
Figure 5:
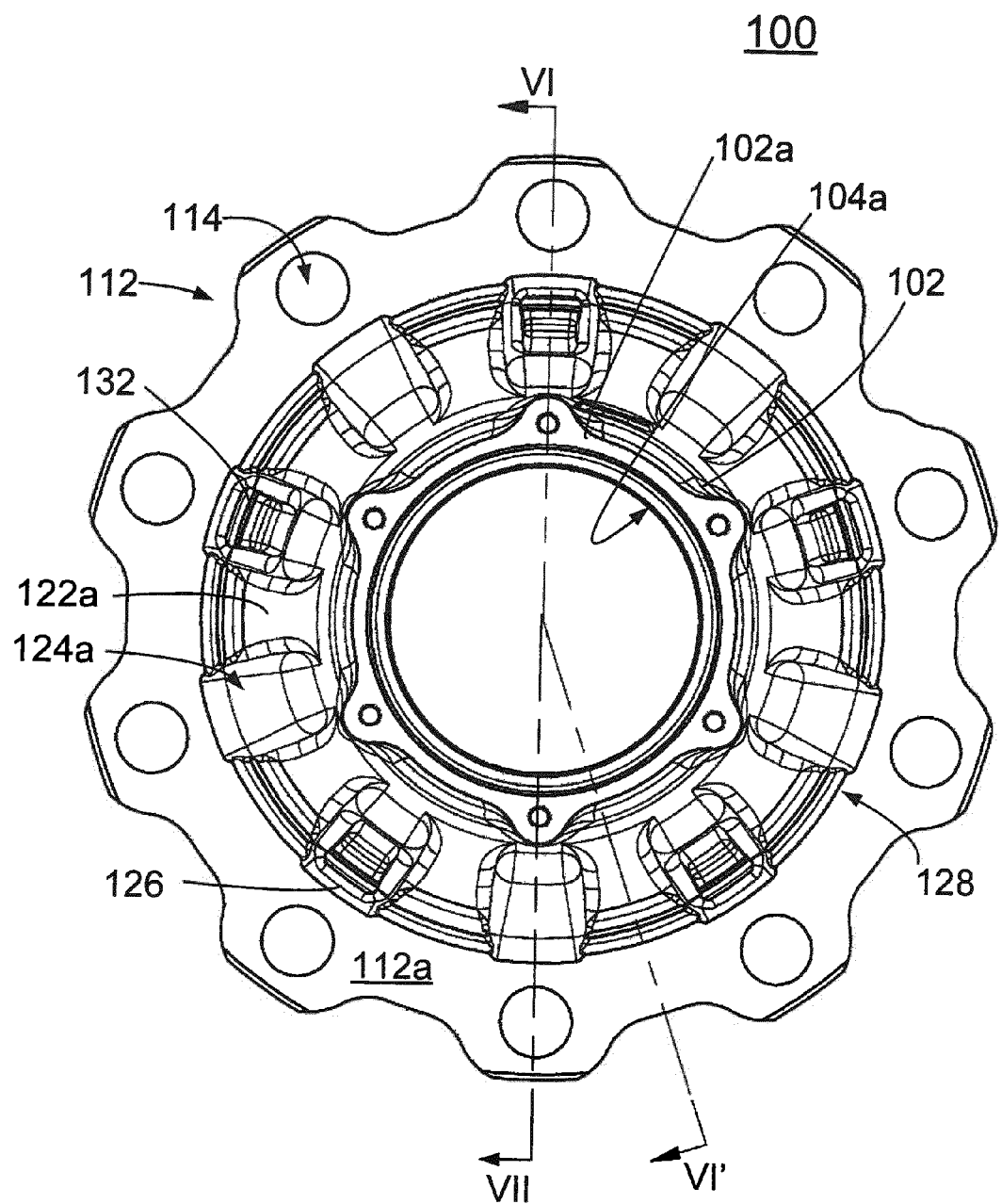
FIG. 5 illustrates an elevation view of the wheel hub shown in FIG. 3, as viewed from the outboard side.
Figure 6:
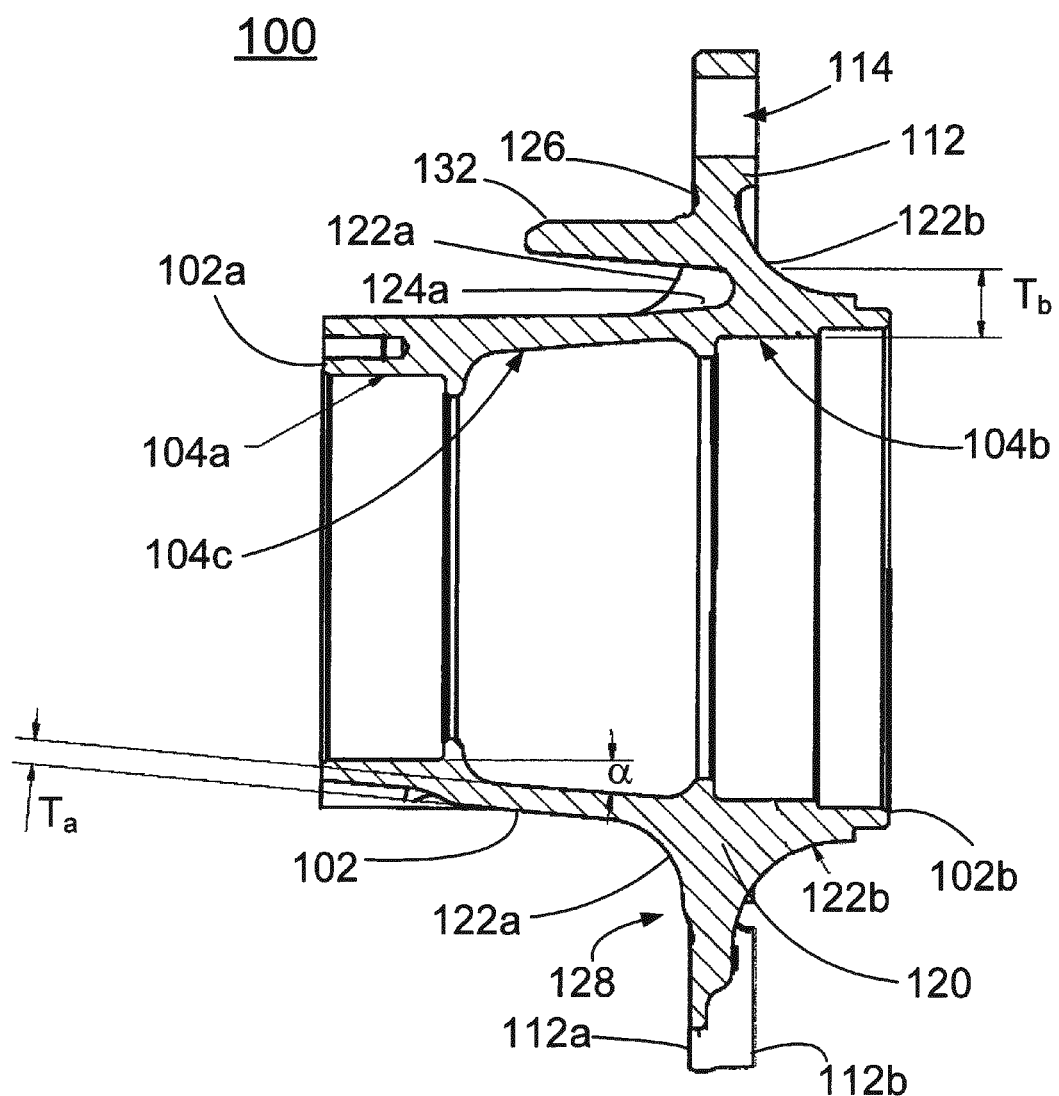
FIG. 6 illustrates a section view of the wheel hub shown in FIG. 3, as viewed along line VI-VI' shown in FIG. 5.
Figure 7:
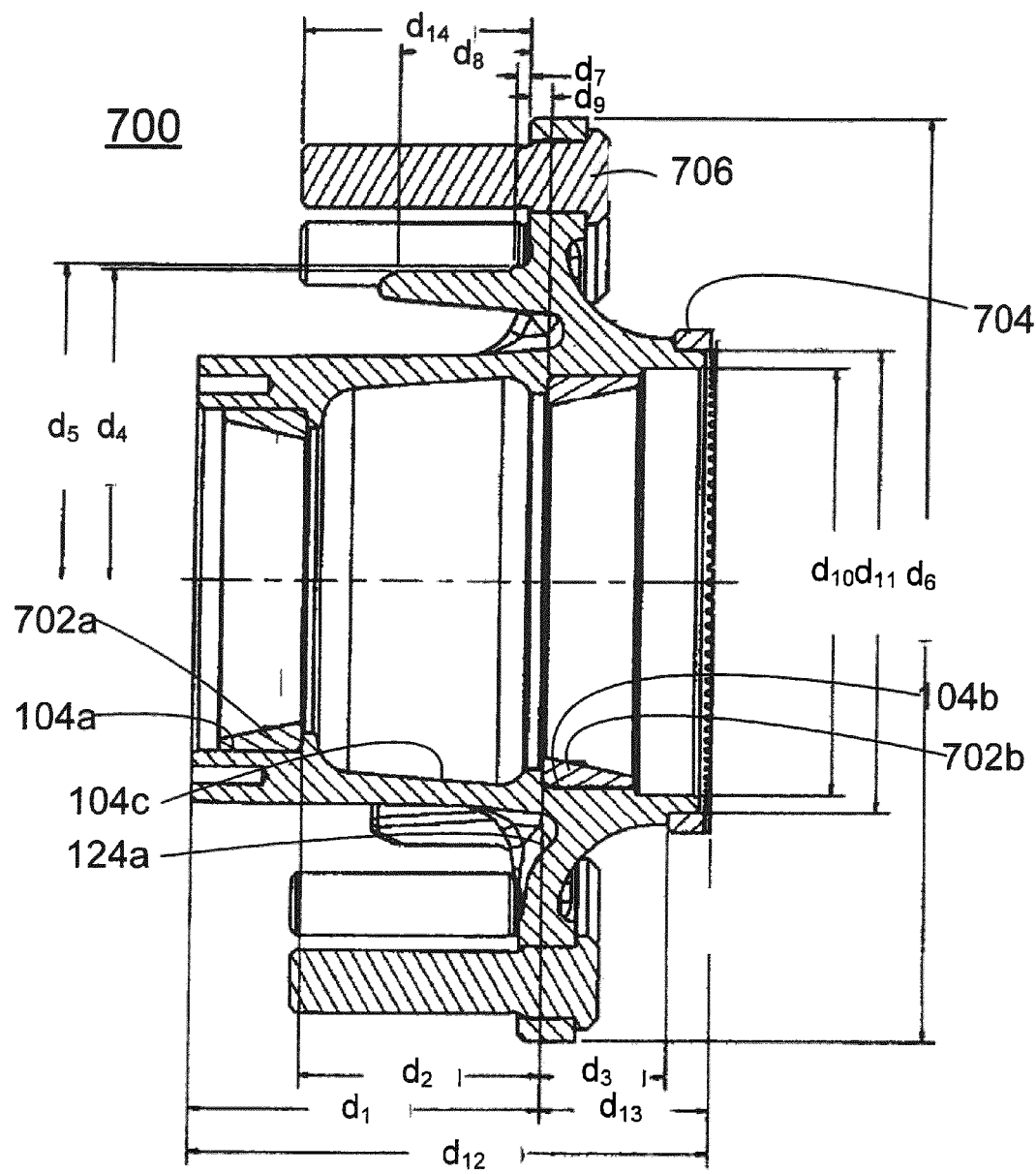
FIG. 7 illustrates a section view of the wheel hub shown in FIG. 3, as viewed along line VI-VII shown in FIG. 5, coupled with additional components of a wheel hub assembly.

FIG. 3 illustrates a perspective view of the outboard side of a wheel hub according to a first embodiment. FIG. 4 illustrates a perspective view of the inboard side of the wheel hub shown in FIG. 3. FIG. 5 illustrates an elevation view of the wheel hub shown in FIG. 3, as viewed from the outboard side. FIG. 6 illustrates a section view of the wheel hub shown in FIG. 3, as viewed along line VI-VI' shown in FIG. 5. FIG. 7 illustrates a section view of the wheel hub shown in FIG. 3, as viewed along line VI-VII shown in FIG. 5, coupled with additional components of a wheel hub assembly.

Referring generally to FIGS. 3 to 7, a wheel hub 100 according to a first embodiment may, for example, include a barrel 102, a flange 112 extending radially away from the barrel 102, and a connection member 120 connecting the flange 112 to the barrel 102.

The barrel 102 includes an outboard end 102a, an inboard end 102b, an outboard bearing bore 104a and an inboard bearing bore 104b. The outboard bearing bore 104a and inboard bearing bore 104b are coaxial with a longitudinal axis of the barrel 102. The barrel 102 further includes a hub cavity 104c between, and coaxial with, the outboard bearing bore 104a and an inboard bearing bore 104b.

Figure 10:
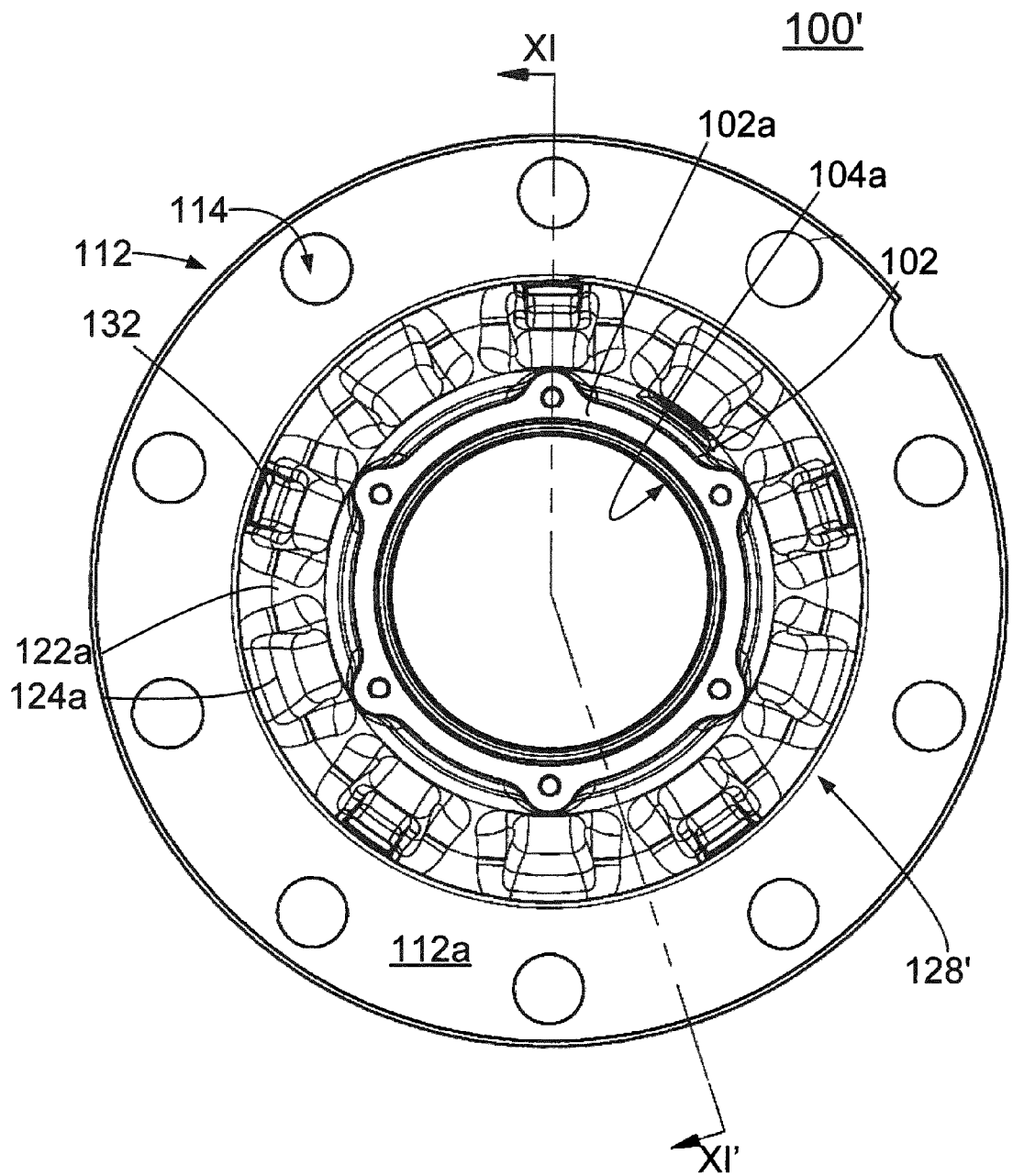
FIG. 10 illustrates an elevation view of the wheel hub shown in FIG. 8, as viewed from the outboard side.

The flange 112 includes an outboard side 112a facing toward the outboard end 102a (and outboard bearing bore 104a) of the barrel 102 and an inboard side 112b facing toward the inboard end 102b (and inboard bearing bore 104b) of the barrel 102. The outboard side 112a and the inboard side 112b of the flange 112 define substantially planar surfaces through which apertures 114 extend where wheel bolts (not shown) may be inserted to mount a wheel. The flange 112 at least partially overlaps the inboard bearing bore 104b along a radial direction perpendicular to the longitudinal axis of the barrel 102. The outboard side 112a of the flange 112 is closer to the inboard end 102b of the barrel 102 than to the outboard end 102a of the barrel 102. Although FIGS. 3 to 7 illustrate the radially-peripheral edge of the flange 112 as being scalloped, it will be appreciated that the radially-peripheral edge of the flange 112 may be generally circular (e.g., as shown in FIG. 10).

The connection member 120 generally includes an outboard side facing toward the outboard end 102a (and outboard bearing bore 104a) of the barrel 102 and an inboard side facing toward the inboard end 102b (and inboard bearing bore 104b) of the barrel 102.

Referring to FIGS. 3 and 5 to 7, the outboard side of the connection member 120 forms an undulating surface around the circumference of the barrel 102. The undulating surface defines outboard ribs 122a and outboard recesses 124a that are alternately disposed around the circumference of the barrel 102 and that are each generally radially oriented with respect to the longitudinal axis of the barrel 102.

Each outboard rib 122a is generally provided as a fillet. Each outboard recess 124a is interposed between the flange 112 and the barrel 102 along a radial direction perpendicular to the longitudinal axis of the barrel 102.

The portion of the connection member 120 defined by the outboard ribs 122a delineates the load paths between the barrel 102 the flange 112 along which most of the load forces generated within the wheel hub 100 are transmitted. The outboard recesses 124a tend to reduce the total weight of the wheel hub 100. Together, the outboard ribs 122a and the outboard recesses 124a allow the weight of a wheel hub 100 to be reduced compared to the wheel hub described with respect to FIGS. 1 and 2 while leaving the wheel hub 100 strong enough to withstand stresses generated during use.

Referring to FIGS. 4, 6 and 7, the inboard side of the connection member 120 forms a large, smooth continuous curved surface extending continuously around the circumference of the barrel 102 defining a fillet 122b extending from the barrel 102 to the flange 112. The fillet 122b extends as a smooth continuous curve from the inboard side 112b of the flange 112 to the barrel 102. In one embodiment, the fillet 122b may have a radius in a range of 0.75-1.5 inches (i.e., about 19.0-38.1 mm), an arc length in a range of 1.15-2.3 inches (i.e., about 29.2-58.4 mm), a chord length in a range of 1-2 inches (i.e., about 25.4-50.8 mm), and an arc angle in a range of 73-88 degrees. In another embodiment, the fillet 122b may have a radius in a range of 1.26-1.35 inches (i.e., about 32.0-32.3 mm), an arc length in a range of 1.6-1.85 inches (i.e., about 40.6-47.0 mm), a chord length in a range of 1.5-1.7 inches (i.e., about 38.1-43.2 mm), and an arc angle in a range of 73-79 degrees. Dimensions of other features of the wheel hub 100 may need to be adjusted when dimensions of the fillet 122b (e.g., the radius, arc length, chord length, arc angle, etc.) are varied to maintain adequate performance characteristics of the wheel hub 100. Configured as described above, the fillet 122b uniformly distributes stresses between the flange 112 and the inboard end 102b of the barrel 102.

Referring back to FIGS. 3 and 5 to 7, the wheel hub 100 includes pilot bosses 132 connected to the connection member 120, wherein each pilot boss 132 is disposed within a corresponding outboard recess 124a. As illustrated, one end of each pilot boss 132 is connected to the connection member 120 while the remainder of the pilot boss 132 within the outboard recess 124a and outside the outboard recess 124a is not connected to the barrel 102 or the flange 112. Thus, each pilot boss 132 is cantileveredly connected to the connection member 120. Because loads are primarily transmitted between the barrel 102 and the flange 112 via the outboard ribs 122a, and because the pilot bosses 132 are cantileveredly connected to the connection member 120 within the outboard recesses 124a, regions of concentrated stress within the barrel 102 and the flange 112 can be reduced or eliminated if the barrel 102 bends relative to the flange 112. Thus, the pilot bosses 132 can be substantially isolated from load paths extending between the barrel 102 and the flange 112. As a result, the occurrence and extent of cracks generated in the barrel 102 and flange 112 due to bending of the barrel 102 relative to the flange 112 can be reduced or eliminated.

In one embodiment, the wheel hub 100 further includes sunken reliefs 126 between corresponding ones of the pilot bosses 132 and the flange 112. The sunken reliefs 126 help to further isolate the pilot bosses 132 from load paths extending between the barrel 102 and the flange 112. Generally, the wheel hub 100 is provided as a unitary, cast piece. Accordingly, the sunken relief 126 is provided as an as-cast relief.

Referring to FIG. 7, the wheel hub 100 forms part of a wheel hub assembly 700, which further includes an outboard bearing assembly 702a disposed within the outboard bearing bore 104a, an inboard bearing assembly 702b disposed within the inboard bearing bore 104b, a tone ring 704 coupled to the inboard end 102b of barrel 102, and wheel bolts 706 received within apertures 114 extending through the outboard side 112a and the inboard side 112b of the flange 112. A wheel and a brake drum (not shown) may be mounted to the wheel hub assembly 700 via the wheel bolts 706.

Figure 8:
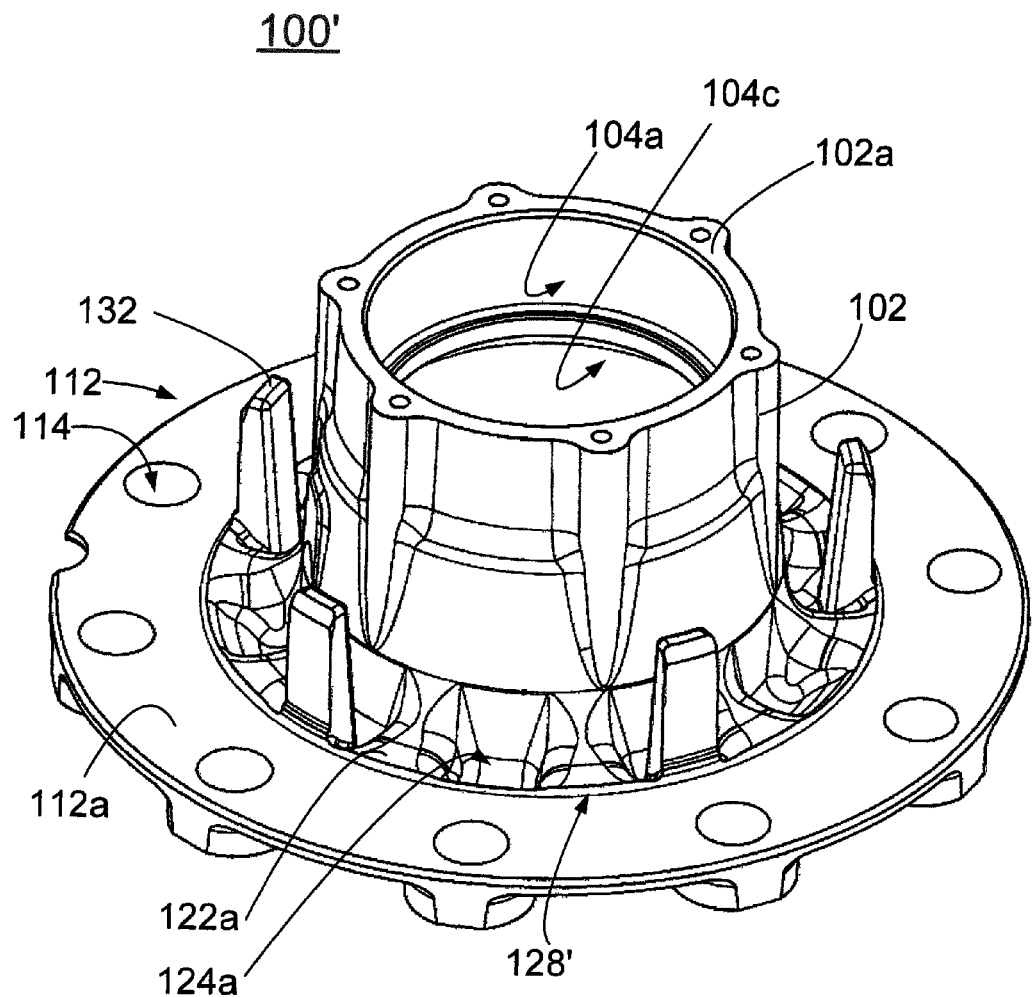
FIG. 8 illustrates a perspective view of the outboard side of a wheel hub according to a second embodiment.
Figure 9:
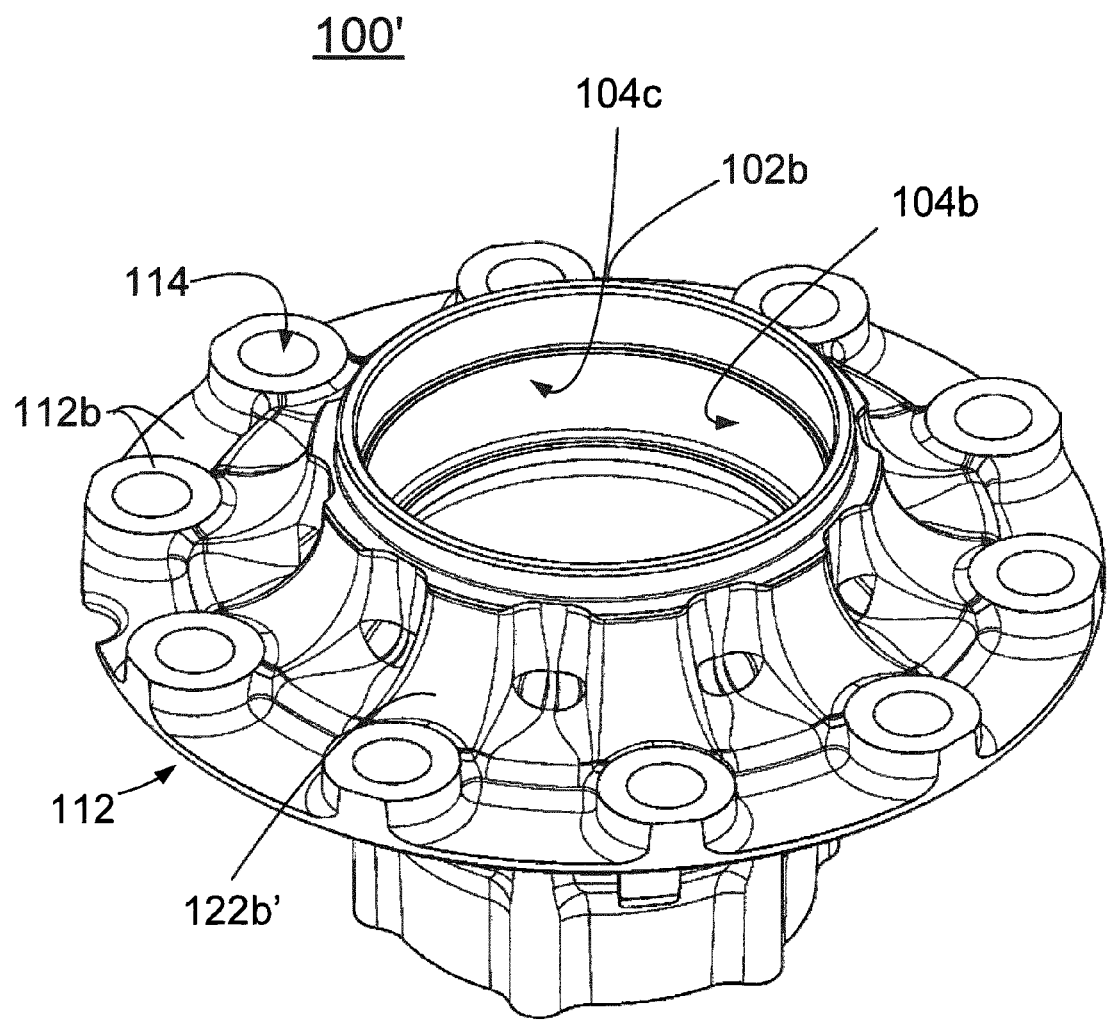
FIG. 9 illustrates a perspective view of the inboard side of the wheel hub shown in FIG. 8.
Figure 11:
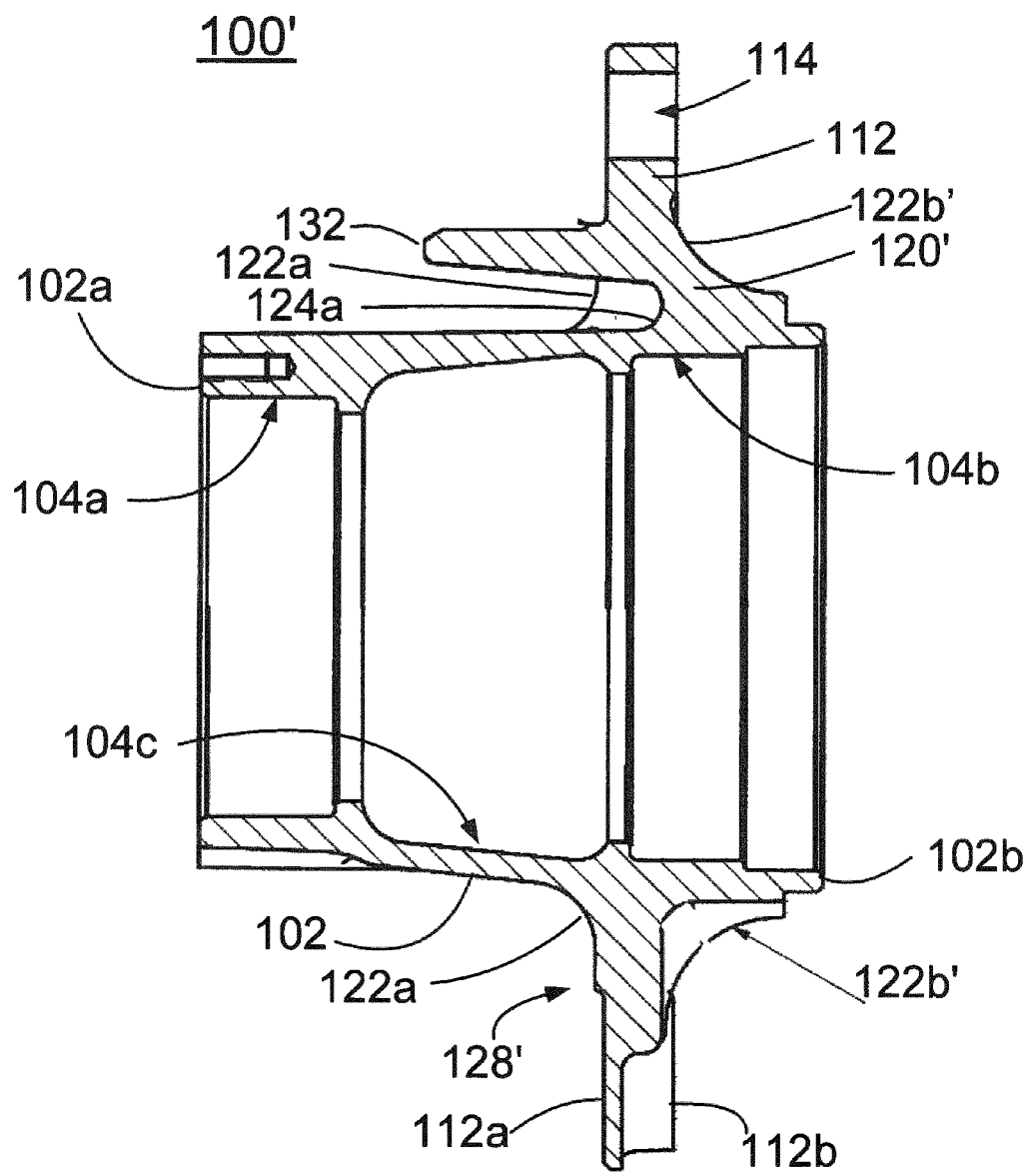
FIG. 11 illustrates a section view of the wheel hub shown in FIG. 9, as viewed along line XI-XI' shown in FIG. 10.

FIG. 8 illustrates a perspective view of the outboard side of a wheel hub according to a second embodiment. FIG. 9 illustrates a perspective view of the inboard side of the wheel hub shown in FIG. 8. FIG. 10 illustrates an elevation view of the wheel hub shown in FIG. 8, as viewed from the outboard side. FIG. 11 illustrates a section view of the wheel hub shown in FIG. 9, as viewed along line XI-XI' shown in FIG. 10.

Referring generally to FIGS. 8 to 11, a wheel hub 100' according to a second embodiment may be provided in a similar manner as discussed with respect to FIGS. 3 to 7 and include barrel 102, a flange 112 extending radially away from the barrel 102 and a connection member 120' connecting the barrel 102 to the flange 112. Although FIGS. 8 to 11 illustrate the radially-peripheral edge of the flange 112 as being generally circular, it will be appreciated that the radially-peripheral edge of the flange 112 may be scalloped (e.g., as shown in FIG. 5).

The connection member 120' generally includes an outboard side facing toward the outboard end 102a (and outboard bearing bore 104a) of the barrel 102 and an inboard side facing toward the inboard end 102b (and inboard bearing bore 104b) of the barrel 102. The outboard side of the connection member 120 forms an undulating surface defining outboard ribs 122a and outboard recesses 124a as exemplarily described with respect to FIGS. 3 and 5 to 7.

However, referring to FIGS. 9 and 11, the inboard side of the connection member 120' also forms an undulating surface around the circumference of the barrel 102. The undulating surface defines inboard ribs 122b' disposed around the circumference of the barrel 102 and that are generally radially oriented with respect to the longitudinal axis of the barrel 102. As illustrated, the inboard ribs 122b' are offset relative to the outboard ribs 122a along the circumference of the barrel 102. Accordingly, the inboard ribs 122b' may be aligned with the outboard recesses 124a along the circumference of the barrel 102.

Each inboard rib 122b' generally has a large, smooth continuous curved surface defining a fillet extending from the barrel 102 to the flange 112. The fillet of each inboard rib 122b' extends as a smooth continuous curve from the inboard side 112b of the flange 112 to the barrel 102. In one embodiment, the fillet defined by each inboard rib 122b' may have a radius in a range of 0.75-1.5 inches (i.e., about 19.0-38.1 mm), an arc length in a range of 1.15-2.3 inches (i.e., about 29.2-58.4 mm), a chord length in a range of 1-2 inches (i.e., about 25.4-50.8 mm), and an arc angle in a range of 73-88 degrees. In another embodiment, the fillet defined by each inboard rib 122b' may have a radius in a range of 1.26-1.35 inches (i.e., about 32.0-32.3 mm), an arc length in a range of 1.6-1.85 inches (i.e., about 40.6-47.0 mm), a chord length in a range of 1.5-1.7 inches (i.e., about 38.1-43.2 mm), and an arc angle in a range of 73-79 degrees. Dimensions of other features of the wheel hub 100' may need to be adjusted when dimensions of the inboard rib 122' (e.g., the radius, arc length, chord length, arc angle, etc.) are varied to maintain adequate performance characteristics of the wheel hub 100'

Because the inboard side of the connection member 120' defines inboard ribs 122b' disposed around the circumference of the barrel 102, the connection member 120' provides less material connecting the inboard side 112b of the flange 112 and the barrel 102 is less than the connection member 120 (the inboard side of which forms the fillet 112 extending continuously around the circumference of the barrel 102). Therefore, the material forming the wheel hub 100' may have a larger yield strength than the material forming the wheel hub 100.

As illustrated, the wheel hub 100' does not include sunken reliefs 126 as described with respect to the wheel hub 100. In one embodiment, however, the wheel hub 100' may include sunken reliefs 126 between corresponding ones of the pilot bosses 132 and the flange 112.

EXAMPLES

Comparative Example

Figure 2:
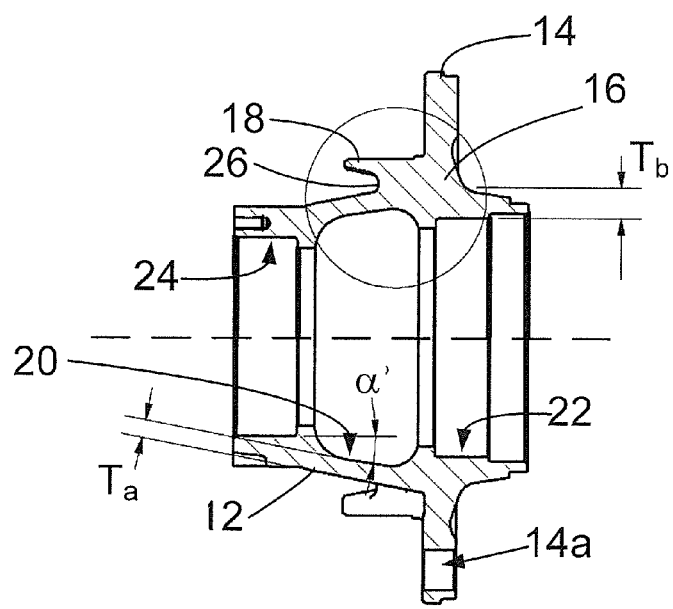
FIG. 2 illustrates a section view of the wheel hub shown in FIG. 1, as viewed along line shown in FIG. 1.

A conventional wheel hub such as wheel hub 10 shown in FIGS. 1 and 2 is typically formed of 65-45-12 ductile iron. The taper angle α (see FIG. 2) of the barrel wall is about 8.5 degrees (±0.5 degrees), the wall thickness $T_a$ (see FIG. 2) of the barrel 12 surrounding the hub cavity 20 is 10.90 mm (±0.51 mm) (i.e., about 0.42 inches), and the thickness $T_b$ of the connection member 16 at the longitudinal midpoint of the inboard bearing bore 22 is 18.81 mm thick (±0.51 mm) (i.e., about 0.74 inches). Such a conventional wheel hub typically weighs about 40 lbs.

Figure 12A:
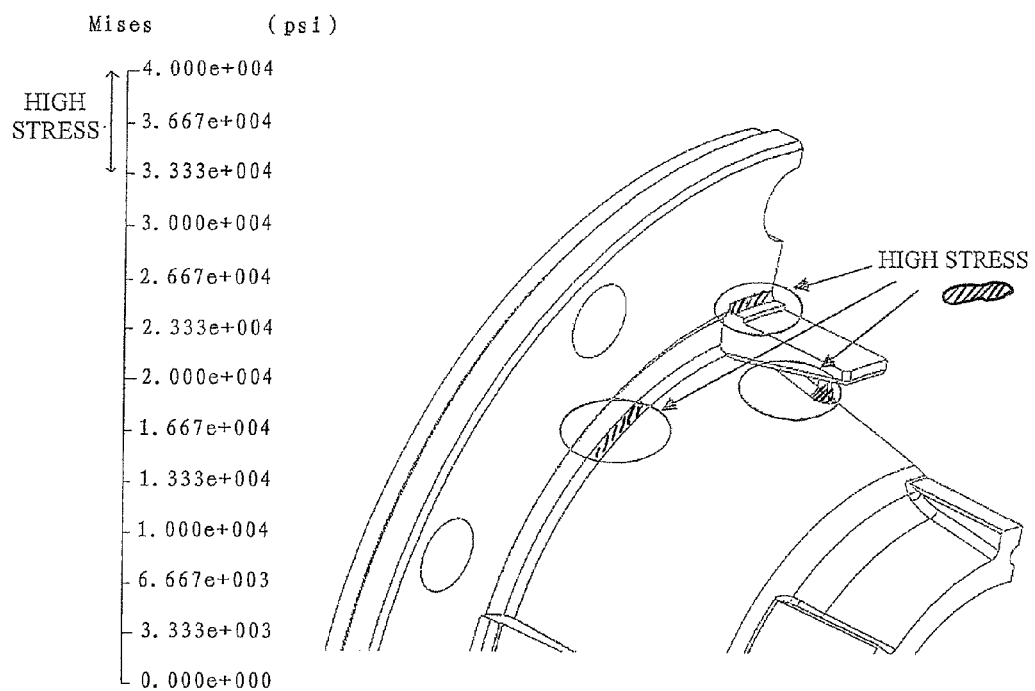
FIGS. 12A and 12B are finite element analysis stress models of a conventional wheel hub such as that described with respect to FIGS. 1 and 2, as viewed from the outboard and inboard ends, respectively, with cross-hatching added to indicate high stress localities.
Figure 12B:
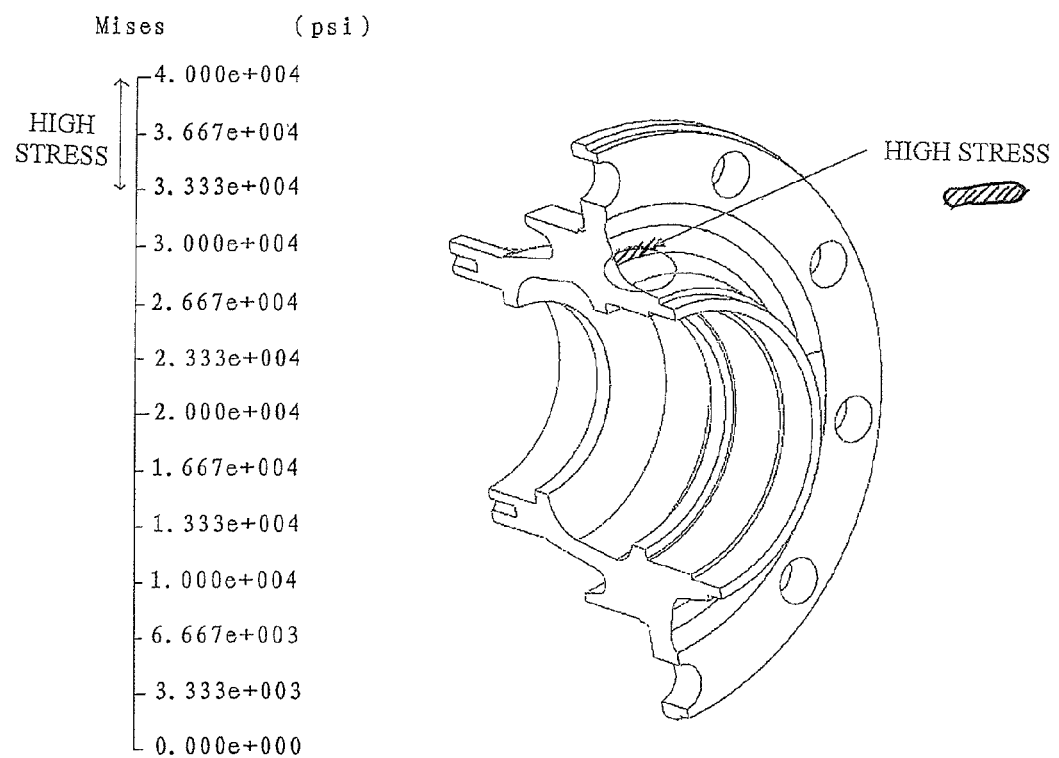

Finite element analysis (FEA) stress models of the wheel hub of the Comparative Example are shown in FIGS. 12A and 12B. As shown, ribs 26 present between the pilot bosses 18 and the barrel 12 tend to generate regions of concentrated stress within the barrel 12 and the flange 14 (e.g., as indicated by the red and orange-colored regions). These high-stress regions can undesirably generate cracks in the barrel 12 and the flange 14.

Example 1

A wheel hub such as the wheel hub 100 was cast using 65-45-12 ductile iron. The taper angle α (see FIG. 6) of the barrel wall was about 4.6 degrees (±0.5 degrees), the wall thickness $T_a$ (see FIG. 6) of the barrel 102 surrounding the hub cavity 104c was 7.86 mm (±0.51 mm) (i.e., about 0.31 inches), and the thickness $T_b$ of the fillet 122b at the longitudinal midpoint of the inboard bearing bore 104b was 21.68 mm (±0.51 mm) (i.e., about 0.85 inches). The wheel hub of Example 1 had a weight of about 32 lbs. Thus, the wheel hub having the dimensions of Example 1 weighed significantly less than the conventional wheel hub and had more material surrounding the inboard bearing bore 104b than the conventional wheel hub.

Figure 13:
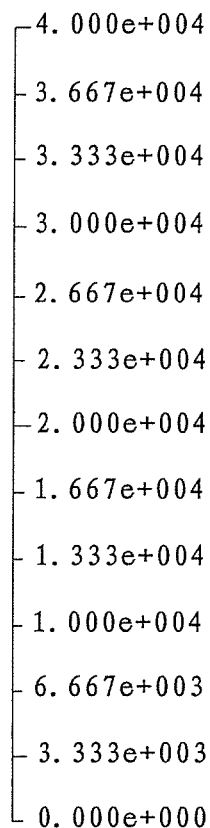
FIG. 13 is a finite element analysis stress model of a wheel hub formed according to the first embodiment as described with respect to FIGS. 3 to 7 in which a radially-peripheral edge of a flange is generally circular, as viewed from the outboard end, respectively.
Figure 13:
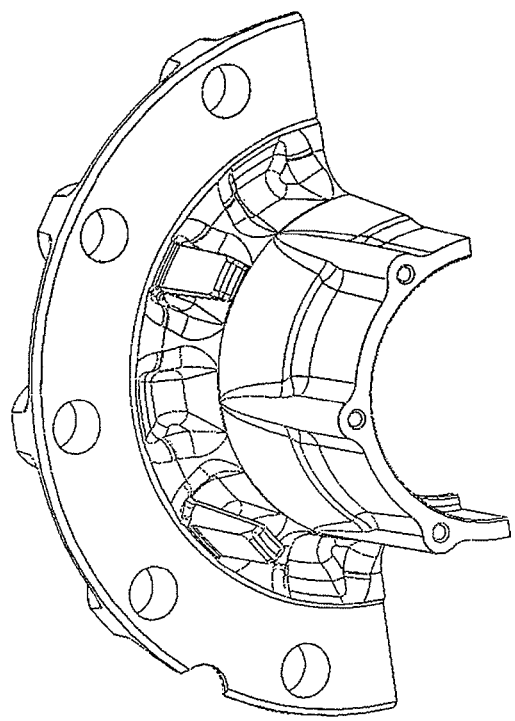

A finite element analysis stress model of the wheel hub of Example 1 is shown in FIG. 13. Because loads are primarily transmitted between the barrel 102 and the flange 112 via the outboard ribs 122a, and because the pilot bosses 132 are cantileveredly connected to the connection member 120 within the outboard recesses 124a, regions of concentrated stress within the barrel 102 and the flange 112 can be reduced or eliminated if the barrel 102 bends relative to the flange 112. Thus, the pilot bosses 132 are substantially isolated from load paths extending between the barrel 102 and the flange 112. As a result, the occurrence and extent of cracks generated in the barrel 102 and flange 112 within the wheel hub of Example 1 due to bending of the barrel 102 relative to the flange 112 can be reduced or eliminated.

Further, the distance from the outboard end 102a to the inboard bearing bore 104b ($d_1$, see FIG. 7) was 124.0 mm (±0.51 mm) (i.e., about 4.88 inches), the length of the hub cavity 104c ($d_2$, see FIG. 7) was 85.1 mm (±0.51 mm) (i.e., about 3.35 inches), the distance from the inboard bearing bore 104b to the end of the of the fillet 122b ($d_3$, see FIG. 7) was 44.4 mm (±0.51 mm) (i.e., about 1.75 inches), the distance from the longitudinal axis of the barrel 102 to a wheel guide surface of the pilot boss 132 ($d_4$, see FIG. 7) was 219.71 mm (±0.51 mm) (i.e., about 8.65 inches), the distance from the longitudinal axis of the barrel 102 to a brake drum guide surface of the pilot boss 132 ($d_5$, see FIG. 7) was 222.91 mm (±0.51 mm) (i.e., about 8.78 inches), the diameter of the wheel hub ($d_6$, see FIG. 7) was 327.0 mm (±0.51 mm) (i.e., about 12.87 inches), the distance from the outboard side 112a of the flange to a distal edge of the brake drum guide surface of the pilot boss 132 ($d_7$, see FIG. 7) was 4.9 mm (±0.51 mm) (i.e., about 0.19 inches), the distance from the outboard side 112a of the flange to a distal edge of the wheel guide surface of the pilot boss 132 ($d_8$, see FIG. 7) was 45.9 mm (±0.51 mm) (i.e., about 1.8 inches), and the distance from the inboard bearing bore 104b to the distal edge of the brake drum guide surface of the pilot boss 132 ($d_9$, see FIG. 7) was 7.7 mm (±0.51 mm) (i.e., about 0.3 inches), the inner diameter of the barrel 102 at the inboard end 102b ($d_{10}$, see FIG. 7) was 152.4 mm (±0.51 mm) (i.e., about 6 inches), and the outer diameter of the barrel 102 at the inboard end 102b ($d_{11}$, see FIG. 7) was 165.0 mm (±0.51 mm) (i.e., about 6.49 inches). When the wheel hub of Example 1 was incorporated into a wheel hub assembly, the distance from the outboard end 102a of the barrel 102 to a distal edge of the tone ring 706 ($d_{12}$, see FIG. 7) was 183.4 mm (±0.51 mm) (i.e., about 7.22 inches), the distance from the inboard bearing bore 104b to the distal edge of the tone ring 706 ($d_{13}$, see FIG. 7) was 59.4 mm (±0.51 mm) (i.e., about 2.34 inches), and the distance from the outboard side 112a of the flange 112 to a distal end of the wheel bolt 708 ($d_{14}$, see FIG. 7) was 80.6 mm (±0.51 mm) (i.e., about 3.17 inches).

Example 2

A wheel hub such as the wheel hub 100' was cast using 80-55-06 ductile iron. The taper angle α (see FIG. 6) of the barrel wall was about 4.6 degrees (±0.5 degrees), the wall thickness $T_a$ (see FIG. 6) of the barrel 102 surrounding the hub cavity 104c was 7.86 mm (±0.51 mm) (i.e., about 0.31 inches), and the thickness $T_b$ of the inboard ribs 122b' at the longitudinal midpoint of the inboard bearing bore 104b was 21.68 mm (±0.51 mm) (i.e., about 0.85 inches). The wheel hub of Example 2 had a weight of about 28 lbs.

Figure 14:
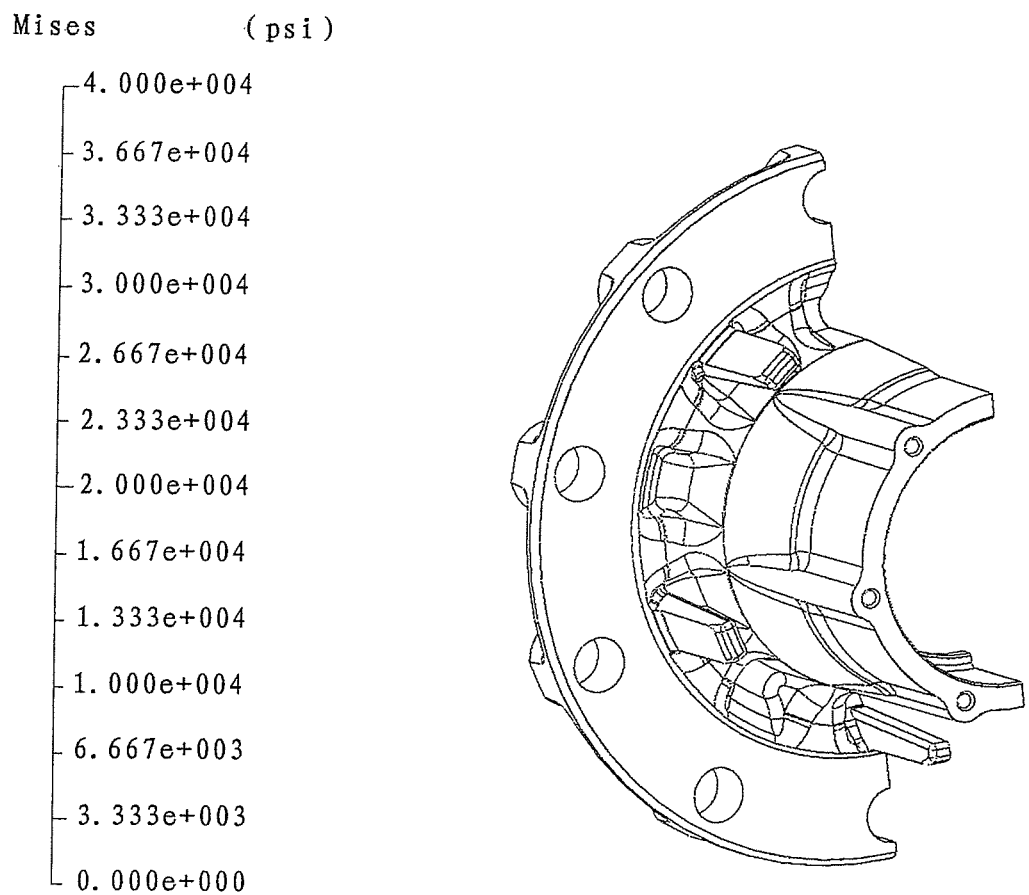
FIG. 14 is a finite element analysis stress model of a wheel hub formed according to the second embodiment as described with respect to FIGS. 8 to 11 in which a radially-peripheral edge of a flange is generally circular, as viewed from the outboard end.
Figure 15:
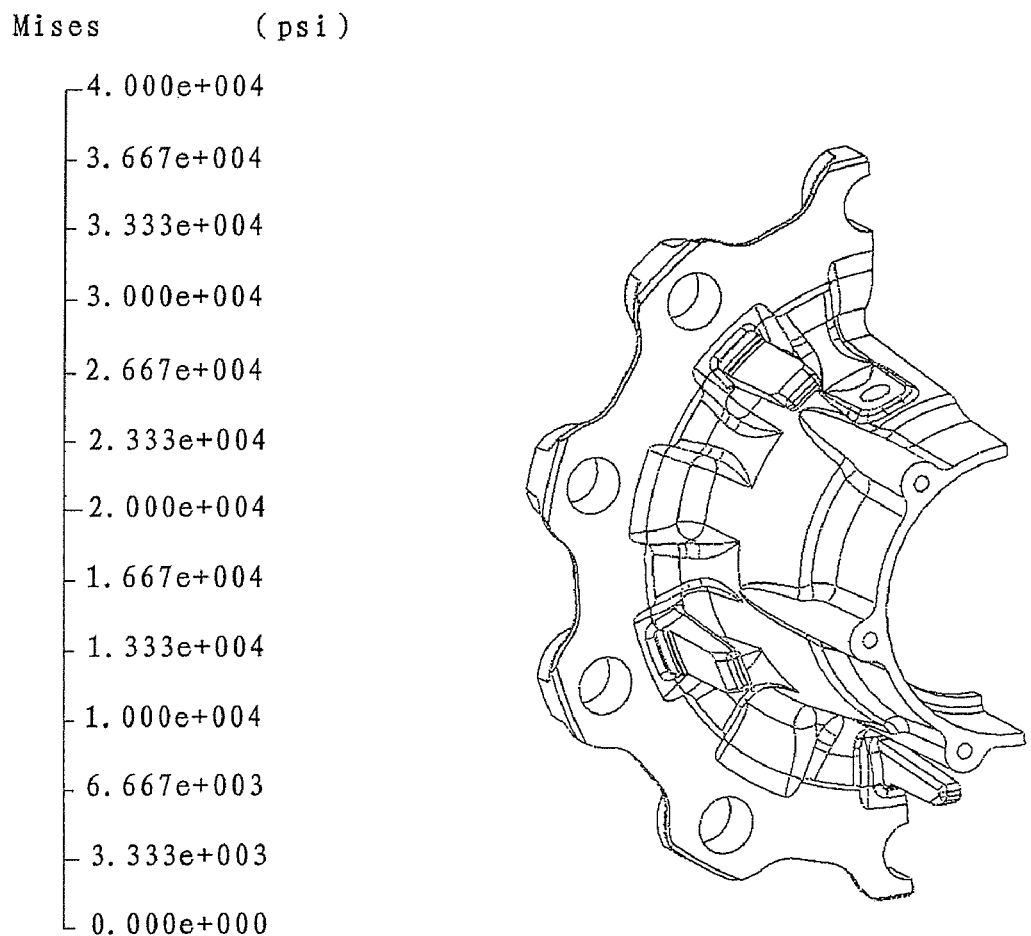
FIG. 15 is a finite element analysis stress model of a wheel hub a formed according to the second embodiment as described with respect to FIGS. 8 to 11 in which a radially-peripheral edge of a flange is scalloped, as viewed from the outboard end.

A finite element analysis stress model of the wheel hub of Example 2 is shown in FIG. 14. A finite element analysis stress model of another wheel hub formed according to Example 2 is shown in FIG. 15. Because loads are primarily transmitted between the barrel 102 and the flange 112 via the outboard ribs 122a, and because the pilot bosses 132 are cantileveredly connected to the connection member 120' within the outboard recesses 124a, regions of concentrated stress within the barrel 102 and the flange 112 can be reduced or eliminated if the barrel 102 bends relative to the flange 112. Thus, the pilot bosses 132 are substantially isolated from load paths extending between the barrel 102 and the flange 112. As a result, the occurrence and extent of cracks generated in the barrel 102 and flange 112 within the wheel hubs of Example 2 due to bending of the barrel 102 relative to the flange 112 can be reduced or eliminated.

The foregoing is illustrative of example embodiments of the invention and is not to be construed as limiting thereof. Although a few example embodiments have been described, those skilled in the art will readily appreciate that many modifications are possible without materially departing from the novel teachings and advantages of the invention. Accordingly, all such modifications are intended to be included within the scope of the invention as defined in the following claims.

What is claimed is:

1. A wheel hub, comprising:
a barrel including an outboard bearing bore and an inboard bearing bore;
a flange extending radially away from the barrel and at least partially overlapping the inboard bearing bore along a radial direction perpendicular to a longitudinal axis of the barrel;
a connection member connecting the flange to the barrel, wherein the connection member comprises:
an outboard side facing toward the outboard bearing bore; and
an inboard side facing toward the inboard bearing bore, wherein the outboard side of the connection member defines outboard ribs and outboard recesses alternately disposed around the circumference of the barrel, and
wherein each outboard recess is interposed between the flange and the barrel along the radial direction perpendicular to the longitudinal axis of the barrel; and
a pilot boss cantileveredly connected to the connection member, wherein the pilot boss is disposed within an outboard recess interposed between two circumferentially adjacent ribs to divert a load path around the pilot boss through the adjacent ribs.

2. The wheel hub of claim 1, wherein the inboard side of the connection member defines a fillet extending from the barrel to the flange;
wherein the fillet defines a radially continuous curve from a side of the flange facing toward the inboard bearing bore to the barrel and extending continuously around the circumference of the hub.

3. The wheel hub of claim 2, wherein curve of the fillet has a radius in a range of 0.75-1.5 inches, an arc length in a range of 1.15-2.3 inches, a chord length in a range of 1-2 inches, and an arc angle in a range of 73-88 degrees.

4. The wheel hub of claim 1, wherein the inboard side of the connection member defines inboard ribs disposed about the circumference of the barrel and extending from the barrel to the flange.

5. The wheel hub of claim 4, wherein the inboard ribs are offset relative to the outboard ribs along the circumference of the barrel.

6. A trailer wheel hub, comprising:
a barrel including an outboard end and an inboard end, an outboard bearing bore and an inboard bearing bore between the outboard end and the inboard end, and a hub cavity between the outboard bearing bore and the inboard bearing bore, wherein the outboard bearing bore, the inboard bearing bore and the hub axis are coaxial with a longitudinal axis of the barrel;
a flange extending radially away from the barrel and at least partially overlapping the inboard bearing bore along a radial direction perpendicular to the longitudinal axis of the barrel;
a connection member connecting the flange to the barrel, wherein the connection member comprises:
outboard ribs extending from a side of the flange facing toward the outboard end to the barrel;
outboard recesses extending between adjacent outboard ribs along a direction around the circumference of the barrel and interposed between the flange and the barrel along the radial direction perpendicular to the longitudinal axis of the barrel; and
a fillet extending as a continuous curve from a side of the flange facing toward the inboard end to the barrel; and
pilot bosses disposed within some of the outboard recesses, wherein each of the pilot bosses is connected at one end to the connection member and extends toward the outboard end and wherein each of the pilot bosses is substantially isolated from load paths extending between the barrel and the flange.

7. The trailer wheel hub of claim 6, wherein the fillet extends continuously around the circumference of the barrel.

8. A trailer wheel hub, comprising:
a barrel including an outboard end and an inboard end, an outboard bearing bore and an inboard bearing bore between the outboard end and the inboard end, and a hub cavity between the outboard bearing bore and the inboard bearing bore, wherein the outboard bearing bore, the inboard bearing bore and the hub axis are coaxial with a longitudinal axis of the barrel;
a flange extending radially away from the barrel and at least partially overlapping the inboard bearing bore along a radial direction perpendicular to the longitudinal axis of the barrel;
a connection member connecting the flange to the barrel, wherein the connection member comprises:
outboard ribs extending from a side of the flange facing toward the outboard end to the barrel;
outboard recesses extending between adjacent outboard ribs along a direction around the circumference of the barrel and interposed between the flange and the barrel along the radial direction perpendicular to the longitudinal axis of the barrel;
the inboard side of the connection member includes inboard ribs disposed about the circumference of the barrel and extending from the inboard bearing bore of the barrel to the flange and wherein the inboard ribs are offset relative to the outboard ribs around the circumference of the barrel; and
pilot bosses disposed within some of the outboard recesses, wherein each of the pilot bosses is connected at one end to the connection member and extends toward the outboard end and wherein each of the pilot bosses is substantially isolated from load paths extending between the barrel and the flange.

* * * * *